Jan. 24, 1956     A. E. CROW     2,732,071
TANK BLEEDER
Filed May 19, 1952
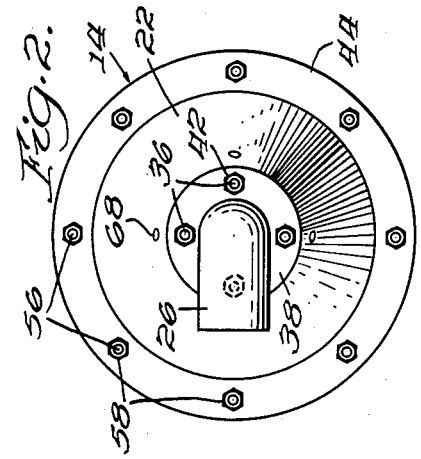
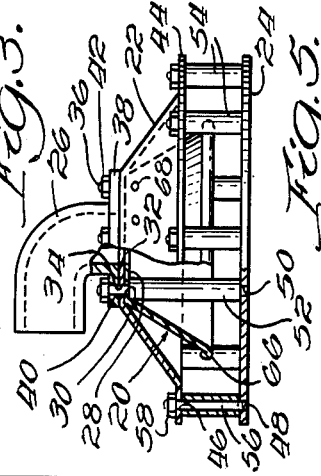
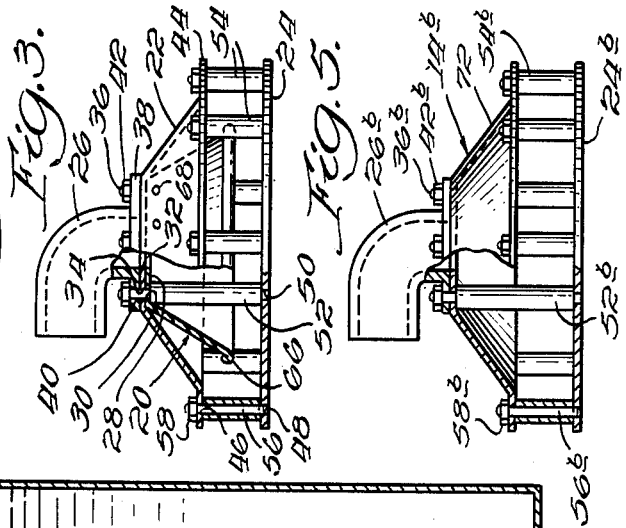
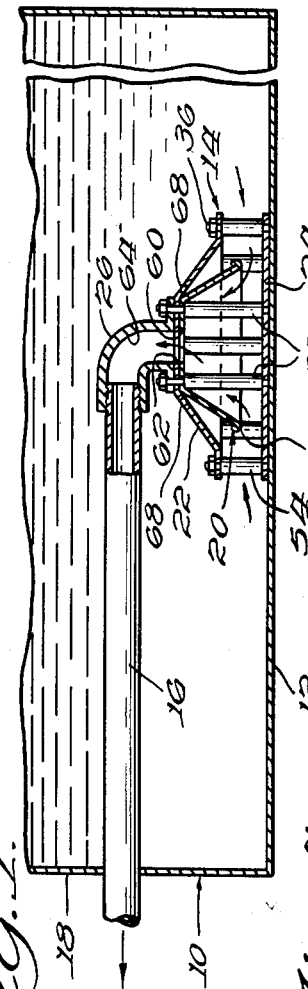
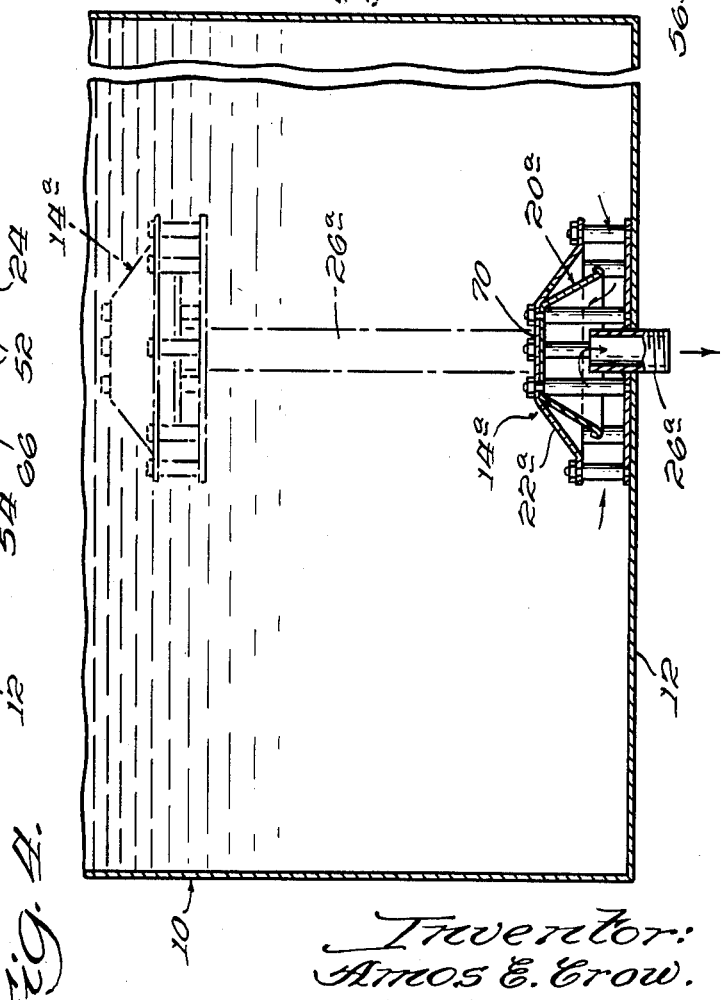
Inventor:
Amos E. Crow.
By Fulwider, Mattingly & Babcock.
Attys.

United States Patent Office 2,732,071
Patented Jan. 24, 1956

2,732,071

TANK BLEEDER

Amos E. Crow, Long Beach, Calif.

Application May 19, 1952, Serial No. 288,685

2 Claims. (Cl. 210—56)

The present invention relates generally to the storage of liquids within tanks, and more particularly to a novel tank bleeder for use with liquid storage tanks.

Liquid storage tanks are widely used throughout the world today. In many instances it is necessary to store a plurality of liquids having different specific gravities in a single storage tank whereby such liquids will assume separate horizontal strata. A common example occurs where oil or other hydrocarbon is stored in a tank together with water, which water may have entered the tank with the oil or perhaps later entered the tank by means of leakage or condensation. Inasmuch as such water will have a greater specific gravity than the oil it will settle to the lower part of the tank in the form of a stratum. Thereafter, at such time as it becomes desirable to remove the oil from the tank this stratum of water must be bled off, whereafter substantially uncontaminated oil will remain for withdrawal.

The means heretofore proposed for bleeding off such water has generally comprised a selectively-openable outlet of a comparatively small diameter located near the bottom of the tank. Occasionally, a horizontal pipe of the same diameter as such outlet may be inserted therethrough so as to draw water from a position spaced inwardly from the side of the tank wherein the outlet is formed. With either of these arrangements, unsatisfactory results are obtained inasmuch as considerable turbulence is developed by water entering the small diameter outlet or pipe. Such turbulence effects an intermixing of the oil disposed above the water with the water being bled from the tank, whereby a certain amount of this intermixed oil is bled off together with the water. In this manner a considerable amount of oil may be lost. However, it is true that such oil which is bled off with the water may be later recovered by a resettling process or the like, but such process involves an appreciable amount of time and trouble and hence is to be avoided.

It is possible to avoid such turbulence and its consequent intermixing of oil with the water being bled off by permitting the water to bleed off at a very slow rate. The slow withdrawal rate, however, is generally objectionable, primarily because an operator must stand by during the bleeding operation in order that he may close the outlet valve the moment the oil begins to drain from the tank. Accordingly, it is important that the bleeding off be accomplished as quickly as possible whereby the operator may leave the tank and attend to his other duties. A slow withdrawal rate is also objectionable inasmuch as it prevents the immediate reuse of the storage tank with a new body of oil.

It is a major object of the present invention to provide a tank bleeder for storage tanks which permits a tank to be bled in a minimum amount of time and with a minimum amount of turbulence.

It is a further object of the present invention to provide a tank bleeder for storage tanks which is simple of design and rugged of construction, whereby it may have a long and trouble-free service life.

It is another object of the present invention to provide a tank bleeder for storage tanks which may be made from readily obtainable materials and by simple manufacturing processes whereby it may be sold at a low price.

An additional object of the present invention is to provide a tank bleeder for storage tanks which has a novel arrangement for returning any liquid of a lower specific gravity than that being bled off which inadvertently enters the bleeder to return to the main body of such lighter liquid.

Other objects and advantages of the present invention will become apparent from the following detailed description taken in conjunction with the appended drawings wherein:

Figure 1 is a side sectional view of a preferred form of tank bleeder embodying the present invention.

Figure 2 is a top plan view of the tank bleeder shown in Figure 1.

Figure 3 is a side view partly sectional and showing the details of construction of the tank bleeder as shown in Figures 1 and 2.

Figure 4 is a side elevational view of the other form of tank bleeder embodying the present invention; and Figure 5 is a side view partly sectional showing the details of construction of yet another form of tank bleeder embodying the present invention.

Referring to the drawings and particularly to Figure 1 thereof, there is shown a storage tank generally designated 10 adapted to hold liquids of different specific gravities, as, for example, oil and water. The water within the tank will be disposed in a strata extending upwardly from the bottom 12 of the tank, with the oil being disposed between the interface of the oil and water and the upper portion of the tank. A novel tank bleeder embodying the present invention and generally designated 14, is shown mounted adjacent to the bottom 12 of the tank 10, whereby it may bleed off the stratum of water disposed in the lower portion of the tank. To this end the bleeder 14 is in communication with the exterior of the tank by means of a horizontal pipe 16 shown extending radially outward from the bleeder through one side 18 of the tank.

The preferred form of bleeder 14 shown in Figures 1, 2 and 3 comprises a horizontally disposed generally frusto-conical collector 20; a horizontally disposed generally frusto-conical turbulence shield 22 of lesser slope than the collector 20 and concentric thereto; a base 24 mounting the collector 20 and turbulence shield 22; and an outlet pipe 26 which is interposed between the bleeder 14 and the horizontal pipe 16 so as to transfer liquids therebetween.

The collector 20 and the turbulence shield 22 may be formed of a suitable metal and are shown interconnected at their upper end. For this purpose the collector 20 is shown as having an inwardly extending horizontal flange 28 formed at its upper end which flange includes a plurality of circumferentially-spaced bores 30. Similarly the turbulence shield 22 includes at its upper end an inwardly extending horizontal flange 32, which flange includes a plurality of circumferentially-spaced bores 34 corresponding to the bores 30 of the collector 20. The bores of these two flanges are adapted to be aligned so as to receive bolts 36. Conveniently, the outlet pipe 26 will be formed with an outwardly extending horizontal flange 38 having a plurality of circumferentially-spaced bores 40 corresponding to the bores formed in the flanges of the collector 20 and the turbulence shield 22. By this arrangement, the outlet pipe may be secured to the turbulence shield by the bolts 36 and nuts 42.

The large end of the turbulence shield 22 is shown formed with an external horizontally-extending flange 44, which flange includes a plurality of circumferentially-spaced bores 46. The base 24 is preferably of circular configuration having the same diameter as the turbulence shield 22. The outer portion of this base 24 may include a plurality of circumferentially-spaced bores 48 having the same centers as the bores 46 of the turbulence shield flange 44. The base 24 may likewise be formed at its inner portion with a plurality of circumferentially-spaced bores 50 having the same centers as the bores 28, 34 and 40.

With this arrangement, the collector 20 and turbulence shield 22 may be supported vertically spaced above the base 24 by a plurality of tubular spacers 52 interposed between the underside of the collector 20 and the upper surface of the plate 24, and a plurality of shorter tubular spacers 54 interposed between the flange 44 and the upper surface of the plate 24. The spacers 52 may be secured in place by the same studs 36 and nuts 42 utilized to interconnect the flanges of the collector 20, turbulence shield 22 and outlet pipe 26. The tubular spacers 54 may be secured by studs 56 and nuts 58.

In operation, when it becomes desirable to bleed off the water contained in the lower portion of the tank 10, a valve (not shown) in communication with the horizontal pipe 16 may be opened whereby the water adjacent the bleeder 14 will enter the confines of the collector 20, as indicated by the arrows in Figure 1. Thereafter, this water will be urged upwardly by the weight of the liquid in the upper portion of the tank through central openings 60 and 62 formed in the upper end of the collector 20 and turbulence shield 22, as indicated in Figure 1. These openings 60 and 62 are in communication with the interior passage 64 of the outlet pipe 26. During the bleeding off of the water there will be little if any turbulence created by the entry of the water into the collector 20. This results from the streamlining effect of a curved peripheral lip 66 formed upon the large end of the collector 20. In the event some turbulence should occur however, whereby a small quantity of oil should be drawn towards the large end of the collector, the major portion of such oil will pass upwardly into the annular space separating the inside of the turbulence shield and the exterior of the collector. From here, the oil is free to pass through a plurality of apertures 68 formed about the upper portion of the turbulence shield 22. Inasmuch as the oil will be lighter than the water, such oil as may pass through these apertures is free to return upwardly to the main body of oil.

Referring now to Figure 4, there is shown a modified form of tank bleeder embodying the present invention. It will be observed that this modified form is substantially similar to the bleeder shown in Figures 1, 2 and 3, with the exception that the pipe 26a is arranged so as to conduct water entering the collector 20a downwardly through the bottom 12 of the tank 10. To this end, the upper ends of the collector 20a and the turbulence shield 22a are of closed construction as indicated at 70. The upper end of the outlet pipe 26a is shown extending a short distance above the large end of the collector 20a. The lower end of the outlet pipe may be connected to a pipe similar to that indicated by the numeral 16 in Figure 1, however, such pipe is not shown in Figure 4. It will be apparent that the operation of this modified form of the device is substantially similar to the operation of the bleeder shown in Figures 1, 2 and 3.

As indicated by the dotted lines in Figure 4, it is possible to provide an outlet pipe 26a of any desired length. Thus, the modified tank bleeder 14a may be disposed in the upper portion of the tank 10 whereby it may be utilized to bleed oil from the tank rather than water. When so utilized, the oil being bled from the tank will not create a substantial amount of turbulence when entering the bleeder 14a. Accordingly, any water situated in the tank below the oil will not be drawn upwardly into the bleeder and hence only oil will be withdrawn from the tank.

Referring now to Figure 5, there is shown yet another form of tank bleeder constructed in accordance with the present invention. It will be observed that this form of tank bleeder is substantially similar in construction and operation to that shown in Figures 1, 2 and 3, with the exception that the collector 20 and turbulence shield 22 of the afore-described tank bleeder have been combined into a single horizontally disposed generally frusto-conical member 72. This member 72 is shown rigidly secured at its upper end to an outlet pipe 26b and is supported at its lower end by a flat circular base 24b. Accordingly, there are provided a plurality of tubular spacers 52b and 54b as well as a corresponding number of studs 36b and 56b and nuts 42b and 58b. The operation of this form of tank bleeder 14b in connection with the storage tank 10 is substantially similar to the operation of the afore-described tank bleeders 14 and 14a.

Although there have been described what are at present considered to be the preferred forms of tank bleeders embodying the present invention, it will be apparent to those skilled in the art that various modifications and changes may be made thereto without departing from the spirit of the invention or the scope of the appended claims.

I claim:

1. A tank bleeder for separating and drawing off two layers of liquids of different specific gravities from a tank due to the hydraulic head to which the lowermost layer is subjected, which includes: an outlet pipe having a substantially vertical portion; a horizontally disposed, generally frusto-conical collector extending downwardly from said outlet portion, said collector having a continuous side wall in which a plurality of apertures is formed in the upper portion thereof; a base plate of substantially the same shape and size as the lower end of said collector; means to hold said plate in fixed, vertically spaced parallel relationship with the lower extremity of said collector, said plate and collector defining a continuous opening therebetween of such area that fluid can flow therethrough without appreciable turbulence at the maximum rate said fluid can be discharged from said outlet when said fluid to be separated is subjected to the maximum hydraulic head possible in said tank; a frusto-conical turbulence shield situated within said collector and in communication with said outlet pipe, said shield formed with a continuous side wall disposed at a lesser angle with the vertical than said side wall of said collector to define an annulus-shaped space therebetween, with said shield terminating in a lower horizontal edge intermediately disposed between the lower extremity of said collector and the upper surface of said base plate; and a tubular member extending from said tank through which the lower of the two fluid layers may flow due to the hydraulic head of the upper layer thereon, said fluid after entering said bleeder being separated into a first moving stream flowing into said annulus, and a second more rapidly moving stream flowing upwardly inside said turbulence shield, the relative rates of flow of said streams being determined by the total area of said apertures and the spacing between the lower extremity of said shield and said plate, which ratio is such that portions of said upper fluid layer inadvertently mixed with said lower fluid layer as it enters said bleeder will be directed due to its natural tendency to rise into said first stream and continue said rise as said first stream flows through said apertures to return to the main body of said upper layer.

2. A tank bleeder for separating and drawing off two layers of liquids of different specific gravities from a tank due to the hydraulic head to which the lowermost layer is subjected, which includes: an outlet pipe having a substantially vertical portion; a collector in the form of a shell having a continuous angularly disposed side wall extending downwardly from said outlet, said collector having a plurality of apertures formed in the upper portion thereof;

a base plate of substantially the same shape and size as the lower end of said collector; means to hold said plate in fixed, vertically spaced parallel relationship with the lower extremity of said collector, said plate and collector defining a continuous opening therebetween of such area that fluid can flow therethrough without appreciable turbulence at the maximum rate said fluid can be discharged from said outlet when said fluid to be separated is subjected to the maximum hydraulic head possible in said tank; a turbulence shield positioned within said collector and in communication with said outlet, said shield formed from a conical shell having a continuous side wall disposed at a lesser angularity to the vertical than said collector side wall, the upper portions of said collector and shield side walls being in fluid sealing contact, said shield side wall terminating in a lower horizontal edge situated intermediate the lower extremity of said collector side wall and said plate, with said collector side wall and shield side wall defining an annulus-shaped space therebetween; and a tubular member extending from said tank through which the lower of the two fluid layers may flow due to the hydraulic head of the upper layer thereon, said fluid after entering said bleeder being separated into a first moving stream flowing into said annulus, and a second more rapidly moving stream flowing upwardly inside said turbulence shield, the relative rates of flow of said streams being determined by the total area of said apertures and the spacing between the lower extremity of said shield and said plate, which ratio is such that portions of said upper fluid layer inadvertently mixed with said lower fluid layer as it enters said bleeder will be directed, due to its natural tendency to rise, into said first stream and continue said rise as said first stream flows through said apertures to return to the main body of said upper layer.

References Cited in the file of this patent

UNITED STATES PATENTS

| | | |
|---|---|---|
| 534,203 | Daly | Feb. 12, 1895 |
| 571,278 | McCawley | Nov. 10, 1896 |
| 1,021,960 | Wiest | Apr. 2, 1912 |
| 1,054,004 | LaCroix | Feb. 25, 1913 |
| 1,548,400 | Walker | Aug. 4, 1925 |
| 1,556,732 | Sterrick | Oct. 13, 1925 |
| 1,716,544 | Felten | June 11, 1929 |
| 1,945,824 | Saxe | Feb. 6, 1934 |
| 2,077,074 | Schneible | Apr. 13, 1937 |
| 2,503,455 | Sheren | Apr. 11, 1950 |

FOREIGN PATENTS

| | | |
|---|---|---|
| 22,545 | Great Britain | of 1895 |